Jan. 13, 1942.  W. A. SPEAR  2,269,606

THRUST BEARING ASSEMBLY

Filed March 26, 1940

INVENTOR
Walter A. Spear
BY
Henry G. Dybvig
ATTORNEY

Patented Jan. 13, 1942

2,269,606

UNITED STATES PATENT OFFICE 2,269,606

THRUST BEARING ASSEMBLY

Walter A. Spear, Cincinnati, Ohio, assignor to Victor Electric Products, Inc., Cincinnati, Ohio, a corporation of Ohio Application March 26, 1940, Serial No. 326,026

2 Claims. (Cl. 308—158)

This invention relates to an end thrust bearing and more particularly to an end thrust bearing including a dash pot assembly that, in addition to absorbing or dampening parasitic vibrations, functions as an oiling device.

In the past end thrust bearings have been provided with a ball bearing seated on a washer supported upon a helical spring.

An object of this invention is to provide an end thrust bearing for isolating vibrations by the use of a resilient mounting cooperating with a dash pot assembly for supporting the end of a rotating shaft.

Another object of this invention is to provide an end thrust bearing supported upon a dash pot mounting, which dash pot mounting, in addition to isolating vibrations from the rotary shaft, functions to oil the movable parts.

Another object of this invention is to provide an end thrust bearing that is cheap, efficient, dependable and at the same time so constructed that the shaft may be removed from its mounting without disturbing the dash pot mechanism.

Another object of this invention is to provide a system of lubrication for continuously supplying lubricant to the parts having a relative movement.

Another object of this invention is to supply oil from an oil well by capillary attraction to a device supplying oil to a bearing where it is carried by capillary attraction to the bearing surface.

Other objects and advantages reside in the construction of parts, the combination thereof and the mode of operation, as will become more apparent from the following description.

Figure 1:
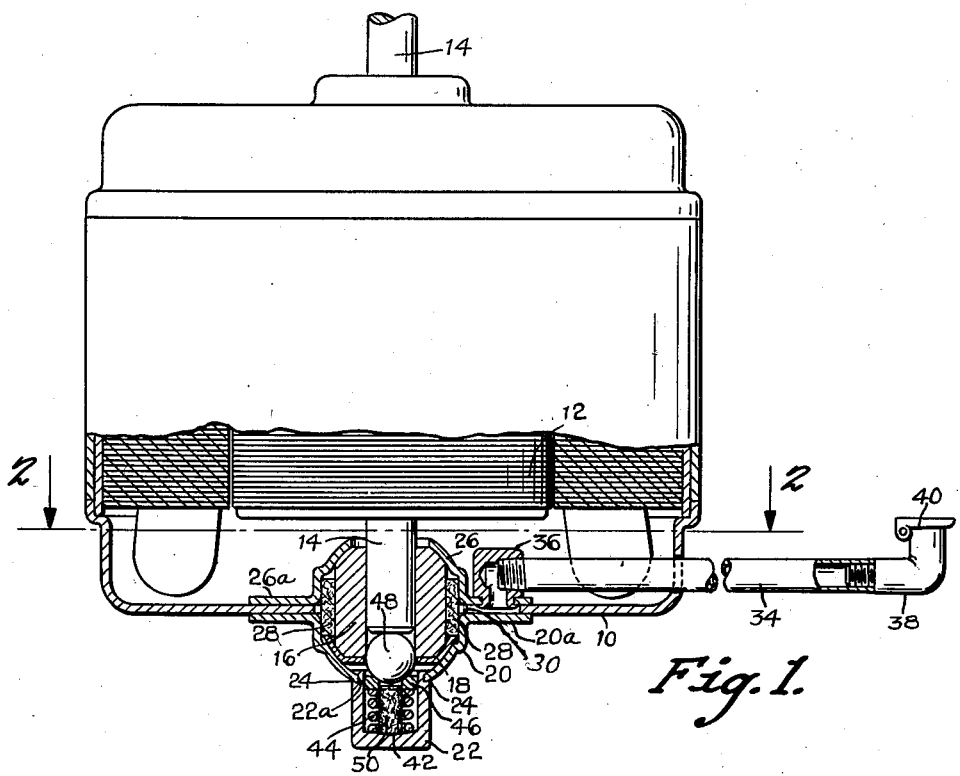

In the drawing, Figure 1 discloses a cross sectional view of the end thrust bearing assembly as it is adapted for use in supporting an armature shaft of an electric motor that may be used for driving a fan or any other rotating part.

Figure 2:
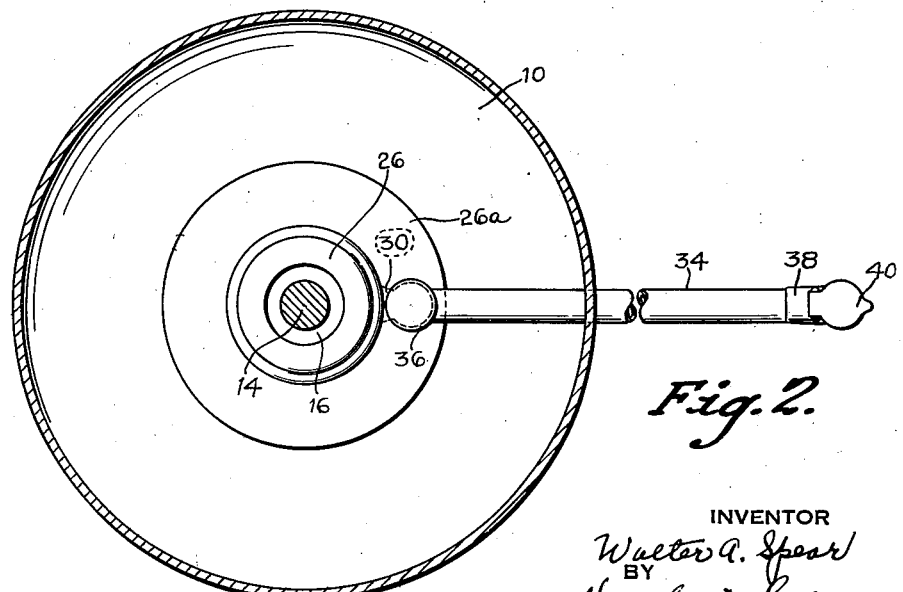

Figure 2 is a sectional view taken on the line 2—2 of Figure 1.

In vertically mounting rotatable shafts, end thrust bearings play an important part in the success of the device. For the purpose of illustration, an armature shaft has been shown without limitation as to the type of shaft used. It is a comparatively easy matter to provide an end thrust bearing that will support the armature and the parts mounted thereon, providing parasitic vibrations generated by the armature and the parts associated therewith do not cause any undesirable disturbances. In some types of structures, especially in household appliances and in office equipment, it may be necessary to mount the end thrust bearing in association with parts that may have natural periods of vibrations corresponding to at least some of the parasitic vibrations. When this takes place, it is necessary, in order to insure smooth operation, either to eliminate the parasitic vibrations or to segregate these, so that they are not transmitted to the parts tending to vibrate in harmony with the parasitic vibrations.

The end thrust bearing disclosed herein has been primarily designed for mounting the armature shaft in the end frame, which is a disclike diaphragm which functions as a vibratory baffle to produce undesirable noises in response to parasitic vibrations, unless the parasitic vibrations are either eliminated or isolated. These have been isolated by the device which will now be described.

Referring to the drawing, the reference character 10 indicates the end frame of an electric motor having the housing broken away, but showing the armature 12 schematically. The armature 12 is mounted upon a rotor shaft 14 mounted for rotation in a bearing 16. This bearing 16 is preferably made from a molded material which may include phosphorous bronze granules, resulting in a porous structure, as is well known to those skilled in the art. The bearing 16 is mounted upon a flexible pad or washer 18 made from a suitable oil absorbent material. This flexible washer is mounted in a cup-shaped cavity in a bearing supporting member 20. This bearing supporting member 20 is provided with a peripheral flange 20a, contacting the periphery in an aperture found in the end frame member 10. The bearing supporting member 20 is provided at its bottom with an aperture receiving a cylindrical cup 22, provided near the top thereof with an annular groove 22a, receiving the edge of the bearing supporting member 20. The top of the cylindrical cup 22 is preferably flared over, so as to lock the cup 22 in temporary relation with respect to the bearing supporting member 20. After assembly members 20 and 22 are preferably welded at 24, so as to provide a fluid-tight juncture between the two. It is to be noted that the inner diameter of the cup 22 is larger than the cylindrical aperture extending through the bearing 16, for reasons which will become more apparent later. A capping member 26, provided with a marginal flange 26a holds the bearing 16 and the parts associated therewith in position. The flange of capping member 26 is preferably welded or otherwise secured to the end frame 10.

The maximum internal diameters of cup-shaped member 20 and capping member 26 is somewhat larger than that of the bearing 16. This leaves a cavity surrounding the bearing 16, which is preferably filled with or houses an oil absorbent collar 28, which may be made of felt or any other oil absorbing material. The shape of cup-shaped member 20 is such that the bearing 16 is self-aligning, due to the arcuate shape of the contacting surfaces.

As may best be seen by referring to Figure 2, the end frame member 10 is provided with a radial V-shaped notch or slot 30. Oil is supplied to the parts through the V-shaped slot 30 from an oil tube 34 mounted in the end frame 10, having the inner end seated in a suitable adapter 36 riveted or otherwise secured to the flange of capping member 26 and the other end provided with an oil receiving T 38, closed with a hinged lid 40. Oil is supplied through the T 38, the tube 34, the adapter 36, the V-notch 30 to the felt member 28. This felt member 28 may be saturated with oil and the cavities associated therewith filled with oil including the oil well 42 in cup-shaped member 22. This oil well 42 houses a helical spring 44 supporting a piston member 46 mounted for slidable movement in the oil well 42. This piston member 46 supports a ball bearing 48, upon which the lower end of the armature shaft 14 rests. The ball bearing 48 completely seals the aperture found in the center of the piston member 46, especially when a film of oil coats the ball bearing 48 and the parts associated therewith. In order to expedite lubrication, the center portion or the core of the spring 44 is provided with an oil absorbent cylindrical plug 50.

When the armature 12 rotates, especially if propelling fan blades, the shaft 14 has a tendency to have up and down reciprocatory movement, or vibratory movement. This movement, if it is not eliminated or isolated from the motor housing, will excite or vibrate the end frame 10 and the mounting for the motor housing, thereby producing parasitic sounds. The shaft 14 is mounted upon the ball bearing 48 seated in the lower end of bearing 16 having the same diameter as the shaft 14, this ball bearing being supported upon the piston member 46, which cooperates with the bore or cylindrical oil well 42 of cup-shaped member 22 to function as a dash pot. Thus, it can readily be seen that parasitic vibrations produced by vibratory movements of the shaft 14 are absorbed or cushioned by the piston 46 resting upon the helical spring 44 and cooperating with the cylindrical oil well 42 in member 22 to function as a dash pot. The dash pot arrangement dampens or overcomes the tendency of the helical spring to vibrate at its natural frequency in response to parasitic vibration of the same frequency in the shaft.

Not only do these parts function as a dash pot; but in addition thereto, the oil well 42 functions as an oil well supplying oil by capillary attention through the cylindrical core 50 to piston member 46 and to a small sector or area of the ball 48. It can be readily seen that as the ball 48 is rotated by coming in contact with the end of the shaft 14, this ball 48 tends to cause the oil coming in contact with the ball 48 to spread outwardly against the bearing surface of the bearing 16. Upon the oil coming in contact with the bearing surface at the periphery of the ball, it is fed by capillary attraction through the pores in the bearing 16 to the contacting bearing surface coming in contact with the lower end of the shaft 14. Thus, it is seen that the oil from the oil well is supplied by capillary attraction to a member that distributes the oil outwardly into contact with a porous bearing member. From here it is again fed by capillary attraction to the bearing surface. Furthermore, oil may work upwardly between the piston 46 and the cylindrical inner surface of member 22, thereby tending to supply additional oil to the bearing surface. Thus, the housing for the bearing encloses a dash pot arrangement and an oiling system for oiling the bearing surface, the dash pot absorbing parasitic vibrations, dampening natural frequencies of the spring responding to certain parasitic vibrations in the shaft and at the same time supplying oil to the movable parts.

Although the end shaft has been shown as an armature shaft, it may be any other shaft mounted for rotation about a vertical axis, or any movably mounted member requiring a vertically disposed mounting.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An end thrust bearing assembly for use in supporting the end of a vertically disposed armature shaft of an electric motor having an end frame, the combination including a bearing, a flanged cup-shaped member for supporting the bearing, the flange of said cup-shaped supporting member being secured to the end frame, said cup-shaped supporting member terminating in a cylindrical cavity, capping member, an annular oil absorbent ring disposed between the outer periphery of the bearing and the cup-shaped supporting member and capping member, means for supplying oil to said oil absorbent ring, a piston mounted in said cylindrical cavity, a helical spring for supporting the piston, a ball bearing mounted upon the piston and disposed between the piston and the end of the armature shaft, the piston snugly fitting the cylindrical cavity so as to function as a dash pot in supporting the shaft, and an oil absorbent core within the helical spring for supplying oil to the piston, the diameter of the piston being greater than the diameter of the aperture in the bearing, so that the bearing retains the piston in position upon removal of the armature shaft.

2. An end thrust bearing assembly for use in supporting the end of a vertically disposed armature shaft of an electric motor having an end frame, the combination including a bearing, a flanged cup-shaped member for supporting the bearing, the flange of said cup-shaped supporting member being secured to the end frame, said cup-shaped supporting member terminating in a cylindrical cavity, a capping member, a piston mounted in said cylindrical cavity, a helical spring for supporting the piston, a ball bearing mounted upon the piston and disposed between the piston and the end of the armature shaft, the piston snugly fitting the cylindrical cavity so as to function as a dash pot in supporting the shaft, means for oiling the bearing, and an oil absorbent core within the helical spring for supplying oil to the piston, the diameter of the piston being greater than the diameter of the aperture in the bearing, so that the bearing retains the piston in position upon removal of the armature shaft.

WALTER A. SPEAR.